United States Patent Office 3,826,826
Patented July 30, 1974

3,826,826
GERMICIDAL DIPS
Abraham Cantor, Elkins Park, Pa., and Murray W. Winicov, Flushing, N.Y., assignors to West Laboratories, Inc., Long Island City, N.Y.
No Drawing. Continuation of abandoned applications Ser. No. 771,283, Oct. 28, 1968, and Ser. No. 856,191, Sept. 8, 1969. This application Oct. 1, 1971, Ser. No. 185,801
Int. Cl. A61k 27/00
U.S. Cl. 424—149
11 Claims

ABSTRACT OF THE DISCLOSURE

In germicidal dips, and particularly in the hypochlorite treatment of the teats of lactating animals for the prevention and control of mastitis, the improvement that comprises providing a solid lithium hypochlorite concentrate containing about 10 to 50% by weight of available chlorine, and having a maximum free hydroxide equivalent to about 3% LiOH and preferably below 0.5% by weight, dissolving said concentrate in water just prior to use in proportions to provide about 1 to 5% and preferably about 4 to 5% by weight of avilable chloride in the resulting solution, and utilizing such solution as a germicidal dip.

As a special embodiment, particularly for preparing germicidal dips for other purposes, where available chlorine levels of about .01 to 1% are desired, the composition is supplied with buffering and reducing components to be combined with the lithium hypochlorite when preparing use dilutions thereof. The reducing component provides slow inactivation of said hypochlorite, and the amount of reducing component is such as to substantially inactivate the hypochlorite within a practical time interval which is suitably about 2 to 6 times the germicidal contact time intended for such use dilution or dip.

This application is a continuation of applications Ser. No. 856,191, filed Sept. 8, 1969 and Ser. No. 771,283, filed Oct. 28, 1968, both now abandoned.

BACKGROUND OF THE INVENTION

Mastitis has long been a major problem in the dairy industry, with the disease being fostered and spread by the use of high vacuum milking machines. For many years, it has been known that prevention and control of the disease requires great care in the sanitary treatment of the milking apparatus and animal hygiene. The animal treatment, as commonly practiced prior to the past few years, had been essentially limited to washing the udders and teats with various sanitizing solutions *before* the milking. Within the past ten years, and primarily within the last few years, the importance of treating the teats *after* milking, by the use of germicidal solutions as teat dips, has been demonstrated to make an important contribution to the control of mastitis. Two representative publications on this subject are "Use of Sanitizers in Preventing Intra-Mammay Infections" by C. K. Johns, Journal of Milk and Food Technology, 29: 309–312, 1966 and "Development of Effective Teat Dips—Disinfection of Teats," F. K. Neave et al., Nat. Inst. Res. Dairying, pp. 98–101, Report 1965. The latter publication is descriptive of the use of liquid sodium hypochlorite, among other products, as a source of available chlorine.

The currently commercial concentrated available hypochlorite products are widely used as general purpose sanitizers and disinfectants, but have not been found satisfactory when tested for use at dairyman's levels at teat dips. Calcium hypochlorite is commercially available as a powder with a very high (70%) available chloride content. The powder dissolves very slowly, and it is virtually impossible to get hypochlorite solutions as high as 4–5% within any reasonable amount of time. Using solid calcium hypochlorite, there is a real danger of the undissolved particles' adhering to the teat, causing chemical burns. Solid sodium hypochlorite is extremely unstable and too dangerous for dairymen to store and handle. Highly concentrated solutions of sodium hypochlorite containing 10–15% available chlorine are available commercially, but are quite unstable with respect to maintaining their available chlorine content. It is not uncommon for such concentrated sodium hypochlorite solutions to lose half their strength in 2 or 3 months storage. The loss of available chlorine content is accelerated during the warm summer months. Hypochlorite solutions containing 4–5% available chlorine, although more stable than the commercial 10–15% solutions, also deteriorate over a period of months; however, the loss during a one or two day period is insignificant.

THE INVENTION

It has now been discovered that, in accordance with the present invention, the limitations in the preparation, marketing, farm level use, and efficacy of normally germicidal but non-irritating solutions of hypochlorite, as a *post* milking teat dip, can be eliminated by employing stable, solid, powdered lithium hypochlorite compositions, for the preparation of 4–5% solutions of available chlorine, by simple solution of readily soluble powders in water—such solutions then being used directly. Commercial lithium hypochlorites in the form of dry powders containing 10 to 50% and preferably 30 to 40% by weight of available chlorine, are quite stable and safe to store and handle. However, there is generally some free alkali as LiOH in commercial lithium hypochlorites, and this free alkali, calculated as LiOH, should be kept below 3% and preferably below 0.5% by weight. The preferred range value for the ratio of available chlorine to hydroxide (calculated as LiOH) must not be less than 60. For this purpose, if one desires to use e.g. the commercially available lithium hypochlorite, known as LCA Lithium Hypochlorite (Lithcoa), the material may be dry blended with an amount of a suitable dry acidic substance, an acid phosphate, a solid bicarbonate, or the like, in an amount to react with the excess alkali when the composition in dissolved in water. Alternatively, the free alkali can be controlled in the initial manufacture of the dry lithium hypochlorite product, likewise providing a dry powdered material which can be easily stored and used by the dairyman. Accordingly, by preparing teat dip solutions in the amounts needed shortly prior to use, the dairyman is assured of having solutions essentially free of components which can cause irritation to the teats. Commercial lithium hypochlorite may contain varying amounts of other components in addition to LiOCl and LiOH, such as, for example, $Li_2CO_3$, $LiClO_3$, $LiCl$, $NaCl$, $Na_2SO_4$, $K_2SO_4$, representing both indigenous ingredients and solid diluents. The presence of such salts is not objectionable.

The following tabulation will indicate the general and preferred range of components such as may characterize lithium hypochlorite products suitable for use in teat dips:

| Component | Range | Preferred |
|---|---|---|
| Avail. chlorine (from LiOCl)[1] | 10–50% W/W | 30–40% W/W |
| LiOH | 0–3% | 0–0.5% |
| $Li_2CO_3$ | 0.1–5% | 0.5–2% |
| NaCl, $Na_2SO_4$, $K_2SO_4$, $LiClO_3$, LiCl, water | To 100% | To 100% |

[1] As typical of hypochlorites, one atom of chlorine in the plus one state is equivalent to two atoms of elemental chlorine ("zero"), since both are reduced to chloride (Cl−, "minus one"). Thus, from the standpoint of chlorine activity, each part by weight of LiOCl is equivalent to about 1.22 parts by weight of available chlorine.

If a commercial product were found to be generally appropriate, but showed a free alkali (LiOH) content greater than 3% or otherwise higher than the alkali level desired as maximum in the product, the amount of solid acidic material to be added to counteract the excess alkali could readily be determined. If sodium bicarbonate, for example, is used as the acidic material, one would blend with the solid commercial hypochlorite 3.5 parts by weight of sodium bicarbonate per hundred parts per weight of the commercial hypochlorite for each 1% of excess alkali (calculated as LiOH) to be neutralized.

The following examples showing the preparation of typical teat dip solutions in accordance with the present invention will provide a fuller understanding of the invention, but it is to be understood that these examples are given by way of illustration and not of limitation.

Example I

A commercial lithium hypochlorite powder is procured having the following analysis:

| Component | Percent by weight |
|---|---|
| LiOCl | 30 |
| NaCl | 34 |
| $Na_2SO_4$ | } 20 |
| $K_2SO_4$ | |
| LiCl | 3 |
| $LiClO_3$ | 3 |
| LiOH | 2 |
| $Li_2CO_3$ | 1 |
| $H_2O$ | 7 |

This product, providing about 35% by weight available chlorine, and having an LiOH content below 3%, is suitable for use in preparing and disinfecting solutions. By adding 460 grams of this powder to an empty one-gallon container, filling the container to the one-gallon level with tap water, and stirring the contents for about 60 seconds, a clear solution is obtained containing approximately 4% by weight available chlorine and suitable for use as a teat dip.

If other available chlorine concentrations are desired, it is simply necessary to vary the amount of powder. Thus, for example, 580 grams of the powder diluted to one gallon with tap water provides a teat dip solution containing about 5% by weight available chlorine; and four ounces of the powder diluted to one gallon with tap water provides a solution containing approximately 1% by weight available chlorine.

Example II

Having at hand the lithium hypochlorite powder described in Example I, it is desired that the effective free alkali (calculated as LiOH) be reduced to about 0.5% by weight. In order to accomplish this, 100 parts by weight of the powder and 5.25 parts by weight of sodium bicarbonate are dry blended to provide a uniform mixture. This mixture, when dissolved in water at the rate of 485 grams diluted to one gallon with water, provides a solution containing 4% by weight of available chlorine and approximately .06% by weight of free alkali (calculated as LiOH).

This modified powder can be readily dissolved in water in appropriate amounts as described in Example I to provide teat dip solutions which are entirely safe from the standpoint of free alkali present in such solutions.

When preparing germicidal dips for other purposes, as for example for cold sterilization of instruments, rubber articles, fabrics and other items sensitive to chlorine the quantity of lithium hypochlorite used will generally be an amount to provide about 0.01 to 1% available chlorine in a use dilution, i.e., 100 to 10,000 p.p.m. of available chlorine. In treating such chlorine sensitive materials and articles an effective germicidal or sporicidal treatment, depending on the available chlorine concentrate may range from about 5 minutes to 2 hours, and it is desirable to remove such materials and articles from the chlorine solution at the end of such treatment period in order to minimize damage due to more prolonged contact with the chlorine. It is frequently impossible or inconvenient, however, to provide for such timely removal of items from a treatment solution.

As a means for minimizing damage which can thus result to chlorine sensitive items, it is desirable to formulate the germicidal or sporicidal use dilution with reducing components to provide a controlled destruction of the hypochlorite and available chlorine within a practical time interval which may be of the order of 2 to 6 times the active contact period desired for the particular germicidal dip.

Buffering agent is suitably present to provide a controlled pH in the use dilution generally within the range of pH 4 to pH 10. Typical buffering agents which can be employed include:

| Buffer | Approx. pH |
|---|---|
| Sodium bicarbonate | 8–10 |
| Sodium citrate | 4–7 |
| Sodium Phosphate (mixtures of mino- and di-salts) | 6–8 |

Selection of optimum pH can be influenced by the selection of reducing agent as hereinafter described. The optimum pH will also vary from one situation to another depending on the type and pH sensitivity of the articles being treated, and the type germicidal and/or sporicidal action desired.

The reducing agent should be an organic compound containing 1 to 6 carbon atoms in which each carbon atom is either oxidized itself or joined to a carbon which is oxidized to form a grouping selected from the class consisting of —COOX, —CHO, —$CH_2OH$, and =C=O, where X is H or a salt forming cation. Typical reducing agents falling within this class include: formic acid, oxalic acid, tartaric acid, lactic acid, gluconoic acid, citric acid, glycerine, acetaldehyde, formaldehyde, and acetone.

The amount of reducing agent should be within the range of about 0.01 to 5% w./v. based on the use dilution, with the actual amount being generally proportioned to the amount of hypochlorite. Buffering agent is present only in the amount required to maintain the desired pH within the range pH 4–10. This will generally be within the range of about 0.01 to 1% w./v. based on the use dilution.

Depending on the specific amount of available chlorine needed for the germicidal or sterilizing purpose, and the specific safety factor required, the chlorine disappearance time can be set in the following manner.

A quantity of hypochlorite is dissolved in water and the pH is adjusted between the range 4–10, as desired, using appropriate buffering agent. A quantity of organic reducing substance is then added. Portions of the solution are then withdrawn periodically, and "juenched" with an excess of potassium iodide and acetic acid, thereby generating an equivalent amount of iodine which can be titrated with thiosulfate. From the profile of available chlorine vs. time thus obtained, the proper amount of organic reducing substance for the intended purpose can be determined.

In considering the several variables which affect the available chlorine content of the solutions, it must be recognized that the reaction rate is ordinarily a function of the concentration of available chlorine and the reducing agent, and may also be dependent on the pH. Temperature is also a factor with increase in temperature tending to shorten both the germicidal action and chlorine disappearance time. Thus products presented for particular germicidal dip uses should carry indications concerning both the intended use dilution and the approximate temperature for each use dilution.

Due to the inherent reactivity of the hypochlorite and reducing agent it is essential that these components be brought together only when one is ready to prepare a use dilution. Commercial products will therefore generally be presented as two component systems with an amount of hypochlorite and the appropriate amount of reducing and buffering components separated one from the other by various conventional means.

The following Examples will aid in a better understanding of the germicidal dip compositions containing reducing and buffering components, but it is to be understood that these Examples are given by way of illustration and not of limitation.

Example III

One gram of commercial lithium hypochlorite, about 0.2 gram of a phosphate buffer mixture, and 0.5 gram of sodium formate were diluted in 100 ml. of water to provide a solution initially containing 350 p.p.m. available chlorine and having a pH of 6.7. The available chlorine content was determined periodically, and is given below.

P.p.m. Available Chlorine as a Function of Time

| Time, minutes | P.p.m. Av. Cl. |
|---|---|
| 0 | 350 |
| 10 | 265 |
| 30 | 145 |
| 60 | 48 |
| 90 | <5 |

In separate experiments, the same ingredients, diluted in the same manner, were found to be both germicidal and sporicidal, and in addition, were devoid of chlorine in 90 minutes.

Example IV

In a series of separate experiments, 1.25 grams of lithium hypochlorite, about 0.3 gram of a phosphate buffer mixture, and 0.5 gram of the reducing substances indicated below, were diluted in 100 ml. water at 25° C. to provide a solution initially containing 438 p.p.m. available chlorine and having a pH of 6.7. The available chlorine as a function of time is given below.

P.P.M. AVAILABLE CHLORINE AS A FUNCTION OF TIME

| Reducing agent | Parts per million | | | | |
|---|---|---|---|---|---|
| | 0 min. | 10 min. | 30 min. | 60 min. | 90 min. |
| Sodium citrate | 438 | 166 | 31 | <1 | |
| Sodium oxalate | 438 | 326 | 89 | 24 | <1 |
| Sodium tartrate | 438 | 398 | 300 | | |
| Sodium gluconate | 438 | 392 | | | |
| Glycerine | 438 | 417 | 394 | 343 | 280 |

The above results indicate that sodium citrate can be used where extreme rapidity of chlorine reduction is desired, but that sodium oxalate would be favored where chlorine activity is to be prolonged. Glycerine, sodium tartrate, and sodium gluconate, in order to be effective in eliminating chlorine, must be used at ratios of reducing agent to initial available chlorine greater than the approximate 10/1 ratio shown above.

Example V

In order to demonstrate the effect of pH on the rate of chlorine loss, additional preparations were made employing 1.25 grams of commercial lithium hypochlorite, about 0.5 gram of a buffer mixture, and 0.5 gram of reducing substance, diluted in 100 ml. water at 25° C. to provide a solution initially containing 438 p.p.m. available chlorine and having the pH indicated below. The results after 10 minutes are given.

| Reducing agent | pH | Initial av. Cl, p.p.m. | P.p.m. av. Cl after 10 min. |
|---|---|---|---|
| Sodium oxalate | 4.7 | 438 | 119 |
| Sodium citrate | 4.7 | 438 | 130 |
| Sodium formate | 4.7 | 438 | 390 |
| Glycerine | 4.7 | 438 | 420 |
| Acetone | 10 | 438 | 270 |
| Do | 6.7 | 438 | 430 |

The above results indicate that while the performance of sodium citrate is not improved significantly in lowering the pH from 6.7 to 4.7 (see previous Example), the sodium oxalate performance is significantly improved. Likewise, acetone is unsuitable for the purpose of this invention at pH 6.7, but is suitable at higher pH. Glycerine was not improved in moving from pH 6.7 to 4.7, and sodium formate was rendered slower acting by the same pH change.

Various changes and modifications in the compositions and procedures herein described for providing improved germicidal dip solutions will occur to those skilled in the art, and to the extent that such changes and modifications are embraced by the appended claims, it is to be understood that they constitute part of the present invention.

We Claim:

1. A composition for use in preparing teat dip solutions for the prevention and control of mastitis consisting essentially of dry powdered lithium hypochlorite concentrate in an amount sufficient to provide about 10 to 50% by weight of available chlorine and containing lithium hydroxide as an impurity; and, a dry substance of acidic reaction in the presence of hydroxide ion selected from the group consisting of acid phosphates and solid bicarbonates, said dry acidic substances being present in an amount such that the maximum free hydroxide available is equivalent to about 3% by weight of LiOH.

2. A composition as defined in claim 1 wherein the effective amount of free hydroxide is less than about 0.5% by weight when calculated as LiOH, and in which the ratio of available chlorine to free hydroxide, calculated as LiOH, is not less than 60.

3. A composition as defined in claim 1 wherein the available chlorine is in the range of about 30 to 40% by weight.

4. A composition as defined in claim 1 wherein said dry substance of acidic reaction in the presence of hydroxide ion is a bicarbonate.

5. A dry composition for use in preparing hypochlorite-containing germicidal solutions, said composition comprising commercial lithium hypochlorite in which free hydroxide present as impurity does not exceed the equivalent of 3% by weight of LiOH, said commercial lithium hypochlorite containing about 10% to 50% by weight available chlorine and present in an amount sufficient to provide about 0.01 to 1% available chlorine in a use dilution; an organic compound functioning as a reducing agent in the presence of the highly oxidizing hypochlorite radical, said organic compound being a $C_1$ to $C_6$ compound wherein each carbon atom is oxidized, or is joined to a carbon atom which is oxidized, to form a grouping selected from the class consisting of —COOX, —CHO, —$CH_2OH$, and =C=O wherein X is H or a salt-forming cation, said reducing agent being present in an amount sufficient to provide about 0.01 to 5% w./v. based upon the volume of said use dilution; and, a buffering agent present in an amount sufficient to provide a controlled pH of said use dilution of about pH 4 to pH 10.

6. A composition as defined in claim 5 wherein the organic compound functioning as a reducing agent is maintained separate from the lithium hypochlorite prior to preparation of such use dilution.

7. A composition as defined in claim 5 wherein the reducing and buffering agents are maintained separate from the lithium hypochlorite prior to preparation of such use dilution.

8. A composition as defined in claim 5 wherein the organic compound functioning as a reducing agent is oxalic acid or a salt thereof.

9. A composition as defined in claim 5 wherein the organic compound functioning as a reducing agent is citric acid or a salt thereof.

10. A composition as defined in claim 5 wherein the organic compound functioning as a reducing agent is formic acid or a salt thereof.

11. A composition as defined in claim 5 wherein the lithium hypochlorite, the organic compound functioning as a reducing agent, and buffering agent are all present as solid substances.

References Cited
UNITED STATES PATENTS

| | | | |
|---|---|---|---|
| 2,071,091 | 2/1937 | Taylor | 424—149 |
| 2,534,781 | 2/1950 | MacMahon | 424—149 |
| 2,590,794 | 3/1952 | Robson | 424—149 |
| 2,695,274 | 11/1954 | MacMahon | 424—149 |
| 3,640,879 | 2/1972 | Fitzgerald | 424—149 |

OTHER REFERENCES

Yearbook of Agriculture (1956), Animal Diseases, pp. 248 and 249.

SAM ROSEN, Primary Examiner